United States Patent
Kwak et al.

(10) Patent No.: US 12,293,567 B2
(45) Date of Patent: May 6, 2025

(54) FEATURE-MAP-ENCODING METHOD AND APPARATUS FOR ENCODING AND DECODING A FEATURE MAP FOR A NEURAL NETWORK

(71) Applicant: Electronics and Telecommunications Research Institute, Daejeon (KR)

(72) Inventors: Sang-Woon Kwak, Daejeon (KR); Joung-Il Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 438 days.

(21) Appl. No.: 17/722,741

(22) Filed: Apr. 18, 2022

(65) Prior Publication Data
US 2022/0335713 A1 Oct. 20, 2022

(30) Foreign Application Priority Data

Apr. 19, 2021 (KR) .................. 10-2021-0050636
Mar. 18, 2022 (KR) .................. 10-2022-0033880

(51) Int. Cl.
*G06V 10/77* (2022.01)
*G06V 10/46* (2022.01)
*G06V 10/74* (2022.01)

(52) U.S. Cl.
CPC ........ *G06V 10/7715* (2022.01); *G06V 10/467* (2022.01); *G06V 10/761* (2022.01)

(58) Field of Classification Search
None
See application file for complete search history.

(56) References Cited

U.S. PATENT DOCUMENTS

| | | | |
|---|---|---|---|
| 7,457,038 B2 * | 11/2008 | Dolgoff | G02B 30/29 359/619 |
| 2006/0227427 A1 * | 10/2006 | Dolgoff | G02B 30/29 359/619 |
| 2020/0097850 A1 * | 3/2020 | Bae | G06N 20/20 |
| 2021/0049741 A1 * | 2/2021 | Yoo | G06T 3/4076 |
| 2021/0150194 A1 * | 5/2021 | Wang | G06V 40/103 |
| 2021/0150726 A1 * | 5/2021 | Kao | G06T 7/168 |
| 2022/0335713 A1 * | 10/2022 | Kwak | G06V 10/761 |

FOREIGN PATENT DOCUMENTS

| | | |
|---|---|---|
| KR | 1020160143548 A | 12/2016 |
| KR | 1020210058638 A | 5/2021 |

OTHER PUBLICATIONS

Han, Heeji et al., Feature map reordering for Neural Network feature map coding, Hanbat National University, Graduate School of Information and Communications Multimedia Engineering, Electronics and Telecommunications Research Institute, The Korean Institute of Broadcast and Media Engineers Conference, Nov. 28, 2020, Seoul, Korea, pp. 180-182.

* cited by examiner

*Primary Examiner* — Tahmina N Ansari
(74) *Attorney, Agent, or Firm* — WILLIAM PARK & ASSOCIATES LTD.

(57) ABSTRACT

Disclosed herein is a method for encoding a feature map. The method may include arranging multiple channels based on similarity therebetween for a feature map having the multiple channels, rearranging the arranged multiple channels so as to be adjacent to each other in a feature map channel having a matrix form, and generating an encoded feature map by converting a feature value corresponding to the feature map channel from a real number to an integer.

20 Claims, 10 Drawing Sheets

COMPARISON EXAMPLE 4     EMBODIMENT 4

FEATURE-MAP-ENCODING METHOD AND APPARATUS FOR ENCODING AND DECODING A FEATURE MAP FOR A NEURAL NETWORK

CROSS REFERENCE TO RELATED APPLICATIONS

This application claims the benefit of Korean Patent Application No. 10-2021-0050636, filed Apr. 19, 2021, and No. 10-2022-0033880, filed Mar. 18, 2022, which are hereby incorporated by reference in their entireties into this application.

BACKGROUND OF THE INVENTION

1. Technical Field

The present invention relates generally to a method for encoding a feature map, and more particularly to a feature-map-encoding method and apparatus capable of efficiently encoding and decoding a feature map.

2. Description of the Related Art

Generally, Artificial Intelligence (AI) technology is configured with technical factors that simulate the functions of a human brain, such as cognition, decision making, and the like, using a machine-learning (deep-learning) technique, which uses an algorithm for autonomously classifying/learning the features of input data, and a machine-learning algorithm.

Among such AI technologies, a Convolutional Neural Network (CNN) model used for image analysis aims at extracting desired features from images or video. In this process, feature-map-encoding technology may be used in order to reduce the amount of space required to store a feature map image generated in each channel.

For example, although a feature map can be compressed using a general video compression method, when such a conventional image compression method is applied to a feature map, there is a problem in which it is difficult to effectively use the same in a CNN model.

Therefore, what is required is technology for effectively encoding and decoding a feature map generated in the course of CNN processing.

SUMMARY OF THE INVENTION

An object of the present invention is to provide technology for effectively encoding and decoding a feature map in a feature extraction process using a neural network model.

Another object of the present invention is to provide technology for effectively encoding and decoding a feature map and enabling the encoded or decoded feature map to be effectively used in a neural network.

In order to accomplish the above objects, a method for encoding a feature map according to the present invention may include arranging multiple channels based on similarity therebetween for a feature map having the multiple channels, rearranging the arranged multiple channels so as to be adjacent to each other in a feature map channel having a matrix form, and generating an encoded feature map by converting a feature value corresponding to the feature map channel from a real number to an integer.

Rearranging the arranged multiple channels may include calculating a distance from an origin point to an i-th row and a j-th column and rearranging the arranged multiple channels in ascending order of distance.

The distance may be calculated by adding the absolute value of the difference between the i-th row and the origin point and the absolute value of the difference between the j-th column and the origin point.

The distance may be calculated by adding the square of the difference between the i-th row and the origin point and the square of the difference between the j-th column and the origin point.

The method may further include performing a flip with respect to a specific direction of the feature map channel after rearranging the arranged multiple channels.

When an i-th row is an even-numbered row and a j-th column is an odd-numbered column, a flip may be performed in a vertical direction.

In the state in which the flip is performed in the vertical direction, when the i-th row is an even-numbered row and the j-th column is an even-numbered column, a flip may be further performed in a horizontal direction.

When an i-th row is an odd-numbered row and a j-th column is an even-numbered column, a flip may be performed in a horizontal direction.

When an i-th row is an odd-numbered row and a j-th column is an odd-numbered column, a flip may not be performed.

Similarity of feature values between a reference channel and each of the multiple channels may be determined, and the multiple channels may be arranged in descending order of similarity.

Also, an apparatus for encoding a feature map according to an embodiment may include a processor for arranging multiple channels based on similarity therebetween for a feature map having the multiple channels, rearranging the arranged multiple channels so as to be adjacent to each other in a feature map channel having a matrix form, and generating an encoded feature map by converting a feature value corresponding to the feature map channel from a real number to an integer; and memory for storing information about the feature map.

The processor may calculate a distance from an origin point to an i-th row and a j-th column and rearrange the arranged multiple channels in ascending order of distance.

The distance may be calculated by adding the absolute value of the difference between the i-th row and the origin point and the absolute value of the difference between the j-th column and the origin point.

The distance may be calculated by adding the square of the difference between the i-th row and the origin point and the square of the difference between the j-th column and the origin point.

The processor may perform a flip with respect to a specific direction of the feature map channel.

When an i-th row is an even-numbered row and a j-th column is an odd-numbered column, the processor may perform a flip in a vertical direction.

When the i-th row is an even-numbered row and the j-th column is an even-numbered column, the processor may further perform a flip in a horizontal direction.

When an i-th row is an odd-numbered row and a j-th column is an even-numbered column, the processor may perform a flip in a horizontal direction.

When an i-th row is an odd-numbered row and a j-th column is an odd-numbered column, the processor may not perform a flip.

The processor may determine similarity of feature values between a reference channel and each of the multiple channels and arrange the multiple channels in descending order of similarity.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
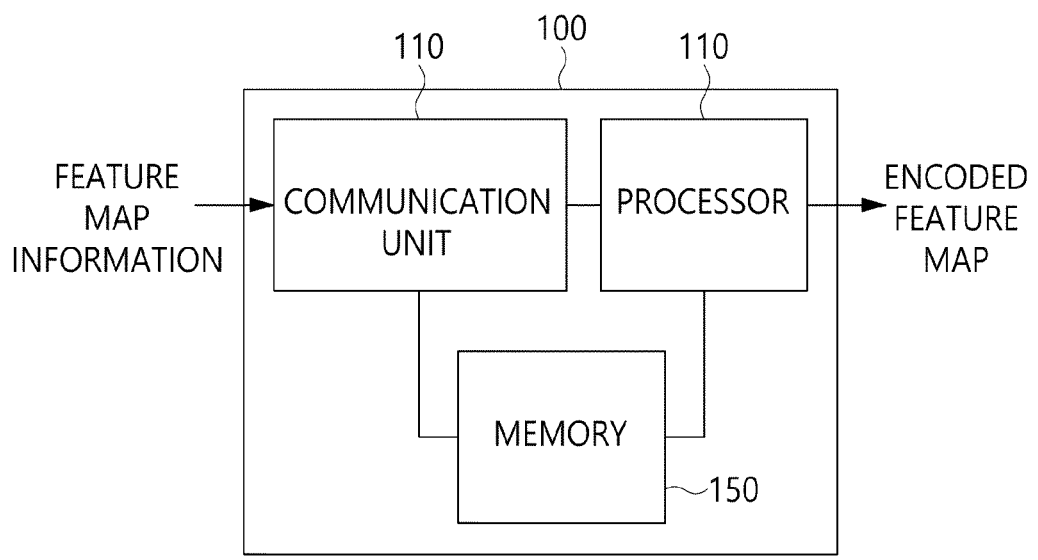
FIG. 1 is a block diagram illustrating an apparatus for encoding a feature map according to an embodiment of the present invention.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description, the same reference numerals are used to designate the same or similar elements throughout the drawings, and repeated descriptions of the same components will be omitted.

FIG. 1 is a block diagram illustrating an apparatus for encoding a feature map according to an embodiment of the present invention.

Referring to FIG. 1, the apparatus 100 for encoding a feature map according to an embodiment may include a communication unit 110, a processor 130, and memory 150.

The communication unit 110 may serve to transmit and receive information required for encoding a feature map through a communication network. Here, the network provides a path via which data is delivered between devices, and may be conceptually understood to encompass networks that are currently being used and networks that have yet to be developed.

For example, the network may be an IP network, which provides service for transmission and reception of a large amount of data and a seamless data service through an Internet Protocol (IP), an all-IP network, which is an IP network structure that integrates different networks based on IP, or the like.

Also, the network may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Also, the network may be any one of a wired/wireless local area communication network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom.

The processor 130 may acquire feature map information pertaining to a feature map. The feature map may be defined using result (feature) values that are output when at least one filter (kernel) is applied to the input of a neural network, and may be represented as a 1D, 2D, or 3D array.

For example, a 2D feature map may be represented using a width and a length, and a 3D feature map may be represented using a width, a length, and a channel size. Also, the number of features (feature values) of a 2D feature map may be equal to the product of the width and the length thereof, and the number of features (feature values) of a 3D feature map may be equal to the product of the width, the length, and the channel size thereof.

The processor 130 may reconfigure the feature map based on the feature map information. When the feature map is configured with multiple channels, the multiple channels may be arranged based on similarity therebetween.

The processor 130 may rearrange the arranged multiple channels so as to be adjacent to each other in a feature map channel. Here, the feature map channel may have a matrix form. For example, the distances to the multiple channels are calculated based on an origin point, and the multiple channels may be rearranged in the feature map channel in ascending order of distance therefrom.

The processor 130 may perform a flip with respect to a specific direction of the feature map channel. Here, the flip may indicate symmetric transposition. For example, the processor 130 may perform a flip in the vertical direction of the feature map channel Alternatively, the processor 130 may perform a flip in the horizontal direction of the feature map channel. Alternatively, the processor 130 may perform a flip in both the vertical and horizontal directions of the feature map channel.

The processor 130 may convert a feature value corresponding to the rearranged feature map channel from a real number to an integer. For example, the feature value may be converted from a real number to an integer through a normalization process using at least one of the average of feature values, the variance thereof, the minimum value of the range thereof after conversion, and the maximum value of the range thereof after conversion.

Hereinafter, a method for encoding a feature map, performed by a feature-map-encoding apparatus, will be described.

Figure 2:
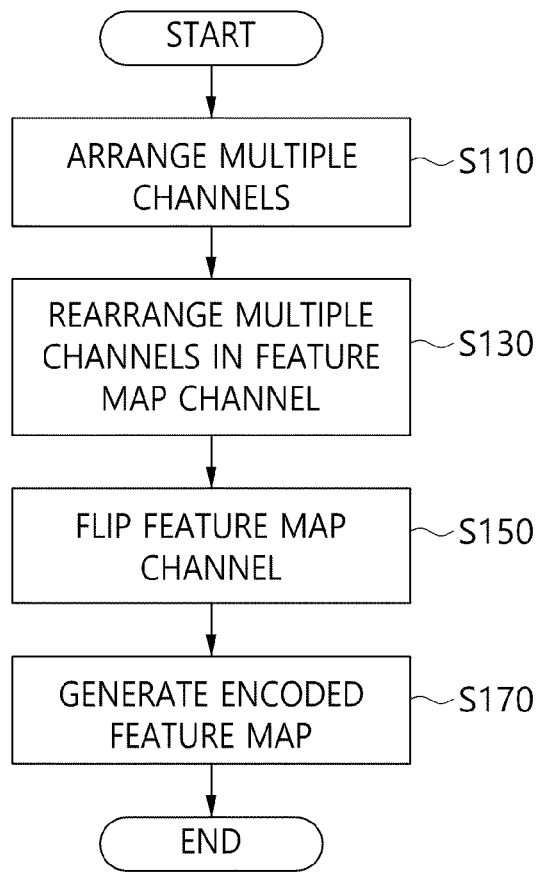
FIG. 2 is a flowchart illustrating a method for encoding a feature map according to an embodiment of the present invention.

FIG. 2 is a flowchart illustrating a method for encoding a feature map according to an embodiment of the present invention.

Referring to FIG. 2, when a feature map having multiple channels is given, the apparatus 100 for encoding a feature map according to an embodiment may acquire feature map information pertaining thereto and arrange the multiple channels based on similarity therebetween at step S110.

Here, the feature map may be the target to be encoded, and may be the output of a specific layer of a neural network. The feature map information may include at least one of the layer number of the neural network, the width of the feature map, the length of the feature map, the channel length of the feature map, the channel number of the feature map, and the difference of number of channels of the feature map.

Figure 3:
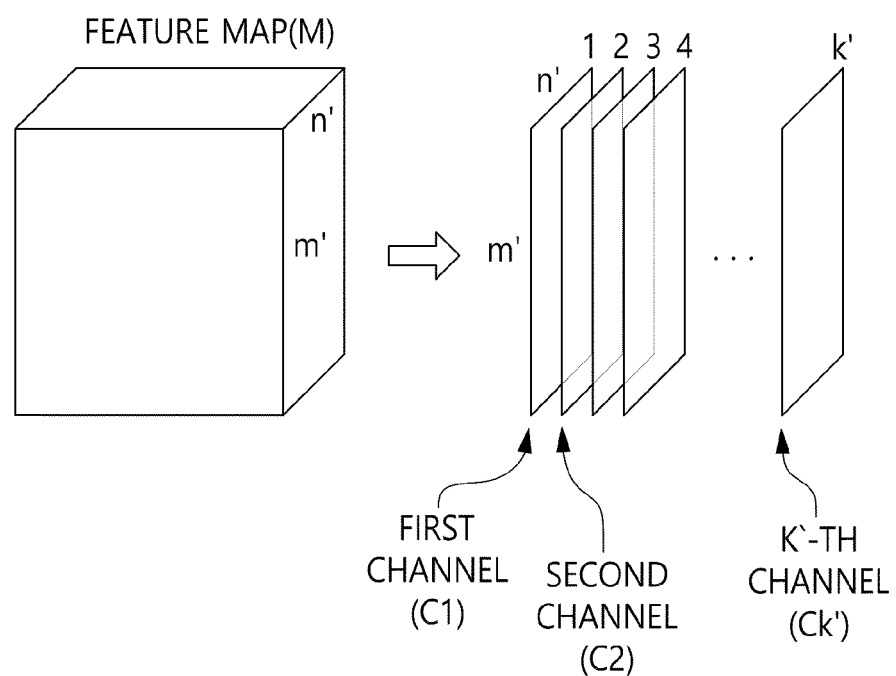
FIG. 3 is a view illustrating the structure of a feature map according to an embodiment of the present invention.

FIG. 3 is a view illustrating the structure of a feature map according to an embodiment of the present invention.

As shown in FIG. 3, a feature map M may include k' channels. The first channel thereof may be referred to as a first channel C1, the second channel thereof may be referred to as a second channel C2, and the last channel thereof may be referred to as a k'-th channel Ck'.

Using a feature map channel index included in feature map information, a specific channel, or a specific channel number 1, 2, 3, 4, ..., or k' may be designated. For example, the first channel C1 has a channel index (channel_idx) of 1, and the second channel C2 has a channel index of 2. Accordingly, the channel of the feature map corresponding to a certain channel may be inferred using the feature map channel index.

The apparatus 100 for encoding a feature map may arrange the multiple channels based on similarity therebetween. The apparatus 100 for encoding a feature map may determine the similarity of feature values between a reference channel and each of the multiple channels and arrange the multiple channel in descending order of similarity.

For example, the k' channels may be sorted into the most similar channel, the second most similar channel, the k'-th most similar channel, and the like by determining the similarity between the reference channel and the k' channels.

Assuming that the reference channel is the first channel, the k' channels may be sorted into the channel that is most similar to the reference channel, the channel that is second most similar thereto, the channel that is k-th most similar thereto, and so on using at least one of PSMR and MSE.

Here, the sorted multiple channels may be arranged according to a feature map group sequence or in descending order of similarity.

Referring again to FIG. 2, the apparatus 100 for encoding a feature map may rearrange the arranged multiple channels in the feature map channel at step S130. Here, the feature map channel may be a feature map channel having a matrix form.

Figure 4:
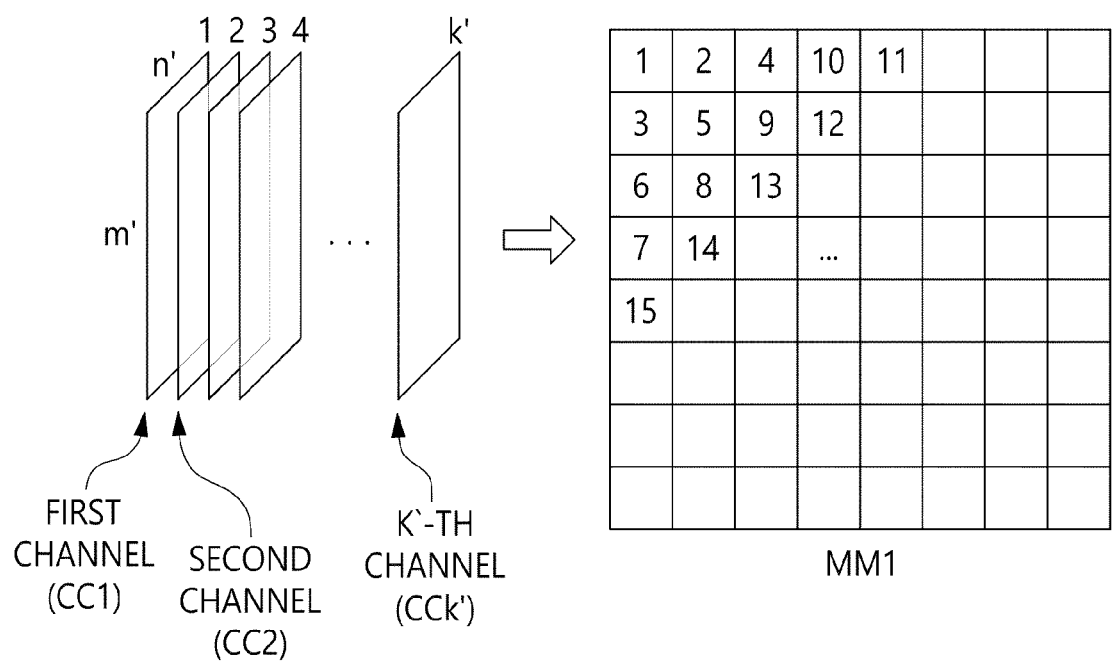
FIG. 4 is a view illustrating the generation of an encoded feature map by rearranging a feature map according to an embodiment of the present invention.

FIG. 4 is a view illustrating the generation of an encoded feature map by rearranging a feature map according to an embodiment of the present invention.

Referring to FIG. 4, the apparatus 100 for encoding a feature map may rearrange the arranged multiple channels CC1, CC2, ..., CCk' so as to be adjacent to each other in a feature map channel MM1. The apparatus 100 for encoding a feature map may sequentially rearrange the multiple channels in the feature map channel MM1 in a row direction, a column direction, or a diagonal direction, but the direction is not limited thereto.

The apparatus 100 for encoding a feature map according to an embodiment may rearrange the multiple channels CC1, CC2, ..., CCk' so as to be adjacent to each other in the upward, downward, leftward, and rightward directions in the feature map channel MM1 based on the distance from an origin point.

For example, when the position at which each of the multiple channels is disposed on an image is represented as 2D integer coordinates (i, j), a first distance $d_{1\_1}$ or a second distance $d_{1\_2}$ from the origin point to each of the rearranged multiple channels is calculated as shown in Equations (1) and (2), and the multiple channels may be arranged in ascending order of first distance $d_{1\_1}$ or second distance $d_{1\_2}$.

$$d_{1\_1}(i, j) = |i-0| + |j-0| \tag{1}$$

$$d_{1\_2}(i, j) = (i-0)^2 + (j-0)^2 \tag{2}$$

For example, the first distance $d_{1\_1}$ may be calculated by adding the absolute value of the difference between the i-th row and the origin point and the absolute value of the difference between the j-th column and the origin point. The second distance $d_{1\_2}$ may be calculated by adding the square of the difference between the i-th row and the origin point and the square of the difference between the j-th column and the origin point.

Accordingly, the rearranged first channel CC1, second channel CC2, ..., k'-th channel CCk' may be sequentially arranged in a diagonal direction in the feature map channel.

Figure 5:
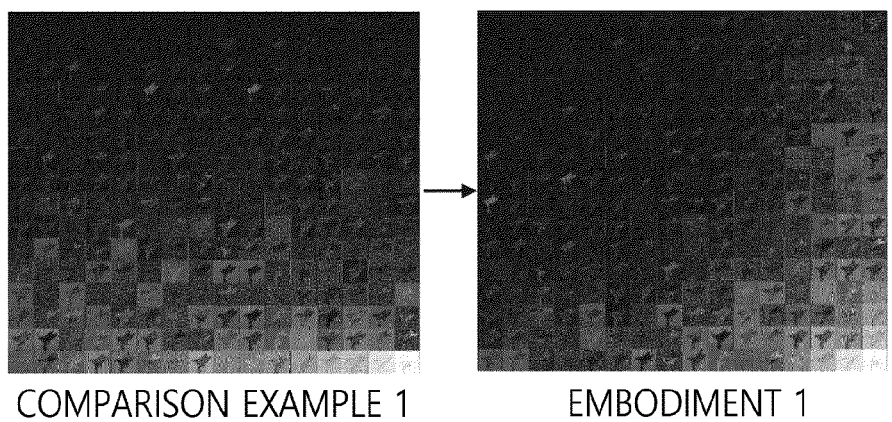
FIG. 5 and FIG. 6 are views illustrating an image processed using a feature-map-encoding method according to an embodiment of the present invention and a comparison example for comparison therebetween.
Figure 6:
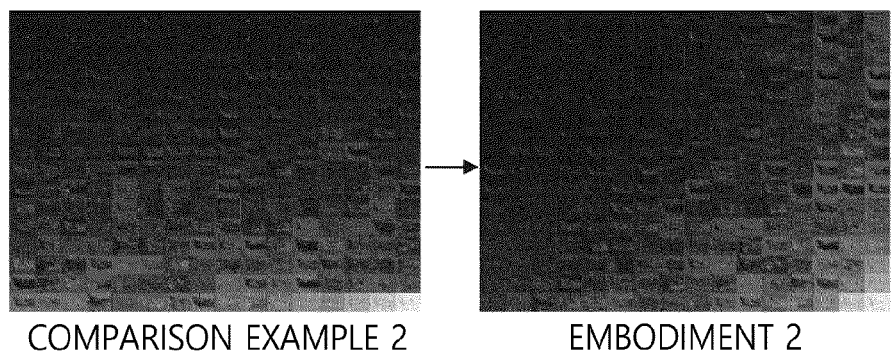

FIG. 5 and FIG. 6 are views illustrating an image processed using a feature-map-encoding method according to an embodiment of the present invention and a comparison example for comparison therebetween.

Embodiments 1 and 2 are images in which multiple channels are arranged in a feature map channel so as to be adjacent to each other based on a first distance or a second distance, and Comparison Examples 1 and 2 are images in which the multiple channels are sequentially arranged in a feature map channel in a row direction.

Referring to FIG. 5, it can be seen that, in the case of the image according to Embodiment 1, similar image blocks are arranged in the column direction based on a specific point in the entire image when compared with the image of Comparison Example 1.

Also, referring to FIG. 6, it can be seen that, in the case of the image according to Embodiment 2, similar image blocks are arranged in the column direction based on another specific point in the entire image when compared with the image of Comparison Example 2.

Referring again to FIG. 2, the apparatus 100 for encoding a feature map according to an embodiment may perform a flip with respect to a specific direction of the feature map channel at step S150.

For example, a large discontinuity may appear in a boundary area in the feature map channel depending on the form of the feature map channel. Accordingly, in an embodiment, a flip may be performed such that the boundary area in which the discontinuity appears has an image that is as similar as possible to that in the area adjacent thereto.

The apparatus 100 for encoding a feature map according to an embodiment may perform a flip in a horizontal direction, a vertical direction, or both horizontal and vertical directions.

Figure 7:
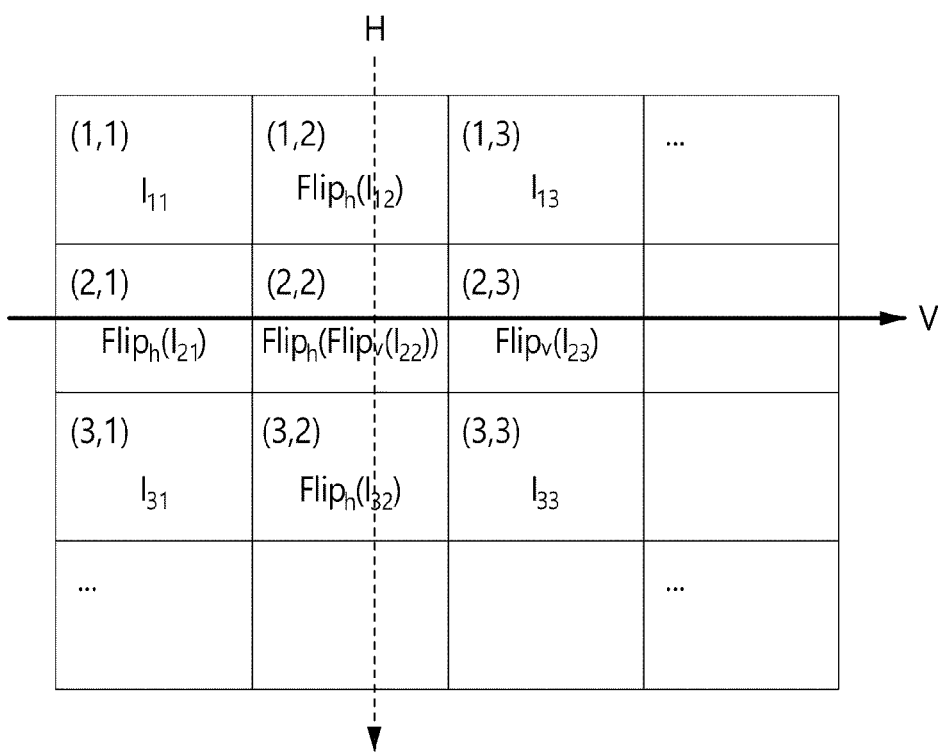
FIG. 7 is a view for explaining a process for flipping a feature map according to an embodiment of the present invention.

FIG. 7 is a view for explaining a process of flipping a feature map according to an embodiment of the present invention.

As shown in FIG. 7, the direction in which an image is flipped may vary depending on the position in which the image is disposed, and the criterion for flipping an image may be set based on Equation (3).

$Flip_v(I_{i,j})$, if i is even and j is odd $Flip_h(I_{i,j})$, if i is odd and j is even $Flip_h(Flip_v(I_{i,j}))$, if i and j are even $I_{i,j}$, if i and j are odd  (3)

For example, when the i-th row is an even-numbered row and the j-th column is an odd-numbered column, a flip may be performed in the vertical direction V of the image. Also, after the flip is performed in the vertical direction V of the image, when the i-th row is an even-numbered row and the j-th column is an even-numbered column, a flip may be performed in the horizontal direction H of the image.

Also, when the i-th row is an odd-numbered row and the j-th column is an even-numbered column, a flip may be performed in the horizontal direction H of the image. Also, when the i-th row is an odd-numbered row and the j-th column is an odd-numbered column, a flip may not be performed.

Figure 8:
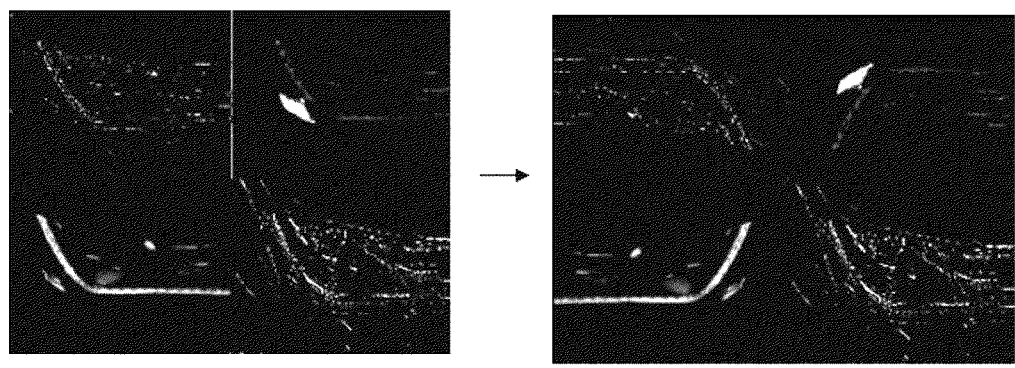
FIG. 8 and FIG. 9 are views illustrating an image in which a flip is performed according to an embodiment of the present invention and a comparison example for comparison therebetween.
Figure 9:
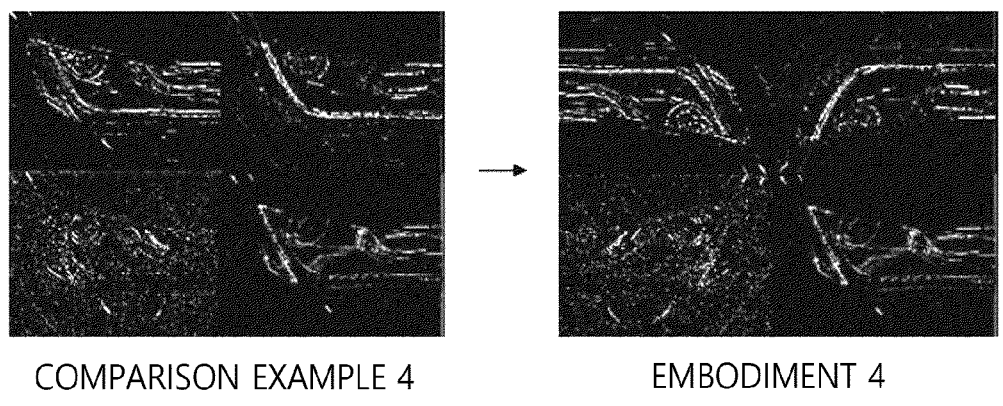

FIG. 8 and FIG. 9 are views illustrating an image in which a flip is performed according to an embodiment of the present invention and a comparison example for comparison therebetween.

Embodiments 3 and 4 are images in which a flip is performed, and Comparison Examples 3 and 4 are images in which a flip is not performed.

Referring to FIG. 8, it can be seen that, in the case of the image according to Embodiment 3, a discontinuity in a boundary area between image blocks is minimized based on a specific point in the entire image when compared with the image according to Comparison Example 3.

Also, referring to FIG. 9, it can be seen that, in the case of the image according to Embodiment 4, a discontinuity in a boundary area between image blocks is minimized based on another point in the entire image when compared with the image according to Comparison Example 4.

Referring again to FIG. 2, the apparatus 100 for encoding a feature map according to an embodiment may generate an encoded feature map at step S170.

In a neural network structure, a feature (value) in a feature map may be represented as either a real number or an integer having a predetermined range. For example, when a feature map has a single channel, the channel of the feature map is configured with a predetermined number of feature values, and the predetermined number may be n'×m'. Here, the range for the real number may be $2^{128} \sim 2^{-128}$, and the range for the integer may be any one of 0~255, 0~511, and 0~1023.

In the encoding process according to an embodiment, the features (values) of the feature map are converted from real numbers to integers, after which encoding may be performed.

Through a normalization process using at least one of the average of the feature values, the variance thereof, the minimum number of the range thereof after conversion, and the maximum number of the range thereof after conversion, the feature values may be converted from real numbers to integers.

For example, through a normalization process using at least one of the average of the feature values (cast_avg), the variance thereof (cast_var), the minimum number of the range thereof after conversion (cast_min), and the maximum number of the range thereof after conversion (cast_max), a predetermined real-number feature value may be converted into an integer feature value ranging from 0 to 255, as shown in Equation (4).

$a$=real-number feature value−cast_avg $a=a$/cast_var $a=a*64$ $a=a+128$ $a=\mathrm{clip}(a,\ \mathrm{cast\_min},\ \mathrm{cast\_max})$  (4)

Here, the average of the feature values (cast_avg) may be the average of the feature values in the entire feature map or a single feature map channel The variance of the feature values (cast_var) may be the variance of the feature values in the entire feature map or a single feature map channel.

Accordingly, in an embodiment, at least one of the average of the feature values, the variance thereof, the minimum value of the range thereof after conversion, and the maximum value of the range thereof after conversion may be signaled in order to encode the feature map.

Although the apparatus and method for encoding a feature map are described in an embodiment, an apparatus and method for decoding a feature map may also be provided.

For example, the apparatus for decoding a feature map may include a communication unit, a processor, and memory, and may perform the method for decoding a feature map. The apparatus for decoding a feature map may acquire feature map information pertaining to an encoded feature map. The apparatus for decoding a feature map may inversely reconfigure the encoded feature map based on the feature map information. The apparatus for decoding a feature map converts the feature values of the inversely reconfigured feature map from integers to real numbers, thereby generating a decoded feature map.

Figure 10:
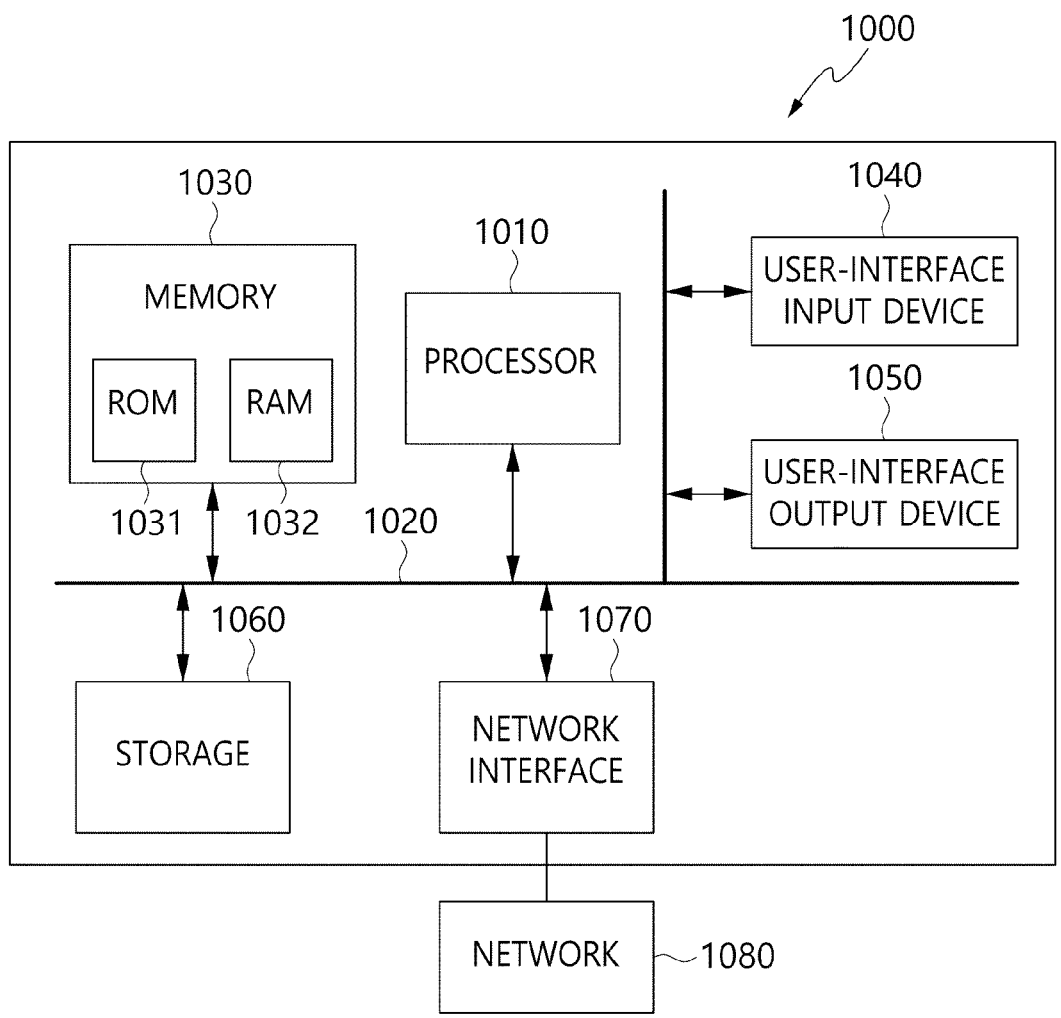
FIG. 10 is a block diagram illustrating the configuration of a computer system according to an embodiment.

FIG. 10 is a block diagram illustrating the configuration of a computer system according to an embodiment.

Referring to FIG. 10, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the apparatus 100 for encoding a feature map.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for encoding a feature map according to an embodiment. Specifically, the memory may store multiple applications running in the apparatus for encoding a feature map and data and instructions for operation of the apparatus for encoding a feature map.

The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to the present invention, a feature map may be effectively encoded and decoded in a feature extraction process using a neural network model.

Also, the present invention may provide technology that enables a feature map to be effectively used in a neural network.

Also, according to the present invention, similar images may be arranged in a column direction by rearranging multiple channels so as to be adjacent to each other in a feature map channel.

Also, according to the present invention, a flip is performed in a boundary area of images, whereby a discontinuity may be prevented from appearing in the boundary area of the images.

Although specific embodiments have been described in the specification, they are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for encoding a feature map, comprising:
packing multiple channels of multi-channel feature map into a single channel feature map; and
encoding the single channel feature map,
wherein multiple channels of the multi-channel feature map are arranged into multiple rows and multiple columns in the single channel feature map, and
wherein, based on a packed position of a channel, one of no-flipping, horizontal flipping, vertical flipping and horizontal-vertical flipping is applied to the channel, the packed position of the channel being represented as i-th row and a j-th column in the single channel feature map.

2. The method of claim 1, wherein packing orders of the multiple channels are determined based on a similarity of each channel.

3. The method of claim 2, wherein the similarity of a channel is determined with reference to a reference channel among the multiple channels.

4. The method of claim 1, wherein in response to both the i and j being an even number, the no-flipping is applied to the channel.

5. The method of claim 1, wherein, in response to the i being an even number and the j being an odd number, the horizontal flipping is applied to the channel.

6. The method of claim 1, wherein, in response to the i being an odd-number and the j being an even number, the vertical-flipping is applied to the channel.

7. The method of claim 1, wherein, in response to both the i and j being an odd number, the horizontal-vertical flipping is applied to the channel.

8. The method of claim 2, wherein the packing orders represent descending order of the similarity of channels.

9. An apparatus for encoding a feature map, comprising:
a processor configured to:
pack multiple channels of multi-channel feature map into a single channel feature map, and
encode the single channel feature map; and
memory configured to store information on the multi-channel feature map and the single channel feature map,
wherein, based on a packed position of a channel, one of no-flipping, horizontal flipping, vertical flipping and horizontal-vertical flipping is applied to the channel, the packed position of the channel being represented as i-th row and a j-th column in the single channel feature map.

10. The method of claim 1, wherein a feature value in the single channel feature map is refined based on an average value and a deviation value of feature values.

11. The method of claim 10, wherein a refined feature value is obtained by:
subtracting the average value from the feature value; and
dividing a difference obtained by subtracting the average value from the feature value with the deviation value.

12. The method of claim 11, wherein the average value and the deviation value are explicitly encoded into a bitstream.

13. A method for decoding a feature map, comprising:
decoding a single channel feature map; and
restoring a multi-channel feature map by unpacking the single channel feature map,
wherein channels packed into multiple rows and multiple columns in the single channel feature map is restored as multiple channels of the multi-channel feature map,
wherein, based on a packed position of a channel, one of no-flipping, horizontal flipping, vertical flipping and horizontal-vertical flipping is applied to the channel during a restoration of the multiple channels, the packed position of the channel being represented as i-th row and a j-th column in the single channel feature map.

14. The method of claim 13, wherein in response to both the i and j being an even number, the no-flipping is applied to the channel.

15. The method of claim 13, wherein, in response to the i being an even number and the j being an odd number, the horizontal flipping is applied to the channel.

16. The method of claim 13, wherein, in response to the i being an odd-number and the j being an even number, the vertical-flipping is applied to the channel.

17. The method of claim 13, wherein, in response to both the i and j being an odd number, the horizontal-vertical flipping is applied to the channel.

18. The method of claim 13, wherein a decoded feature value in the single channel feature map is refined based on an average value and a deviation value of feature values.

19. The method of claim 18, wherein a refined feature value is obtained by:
multiplying the deviation value to the decoded feature value; and
adding the average value to intermediate feature value, resulting from the multiplication.

20. The method of claim 19, wherein the average value and the deviation value are obtained by decoding information from a bitstream.

* * * * *